UNITED STATES PATENT OFFICE 2,242,524

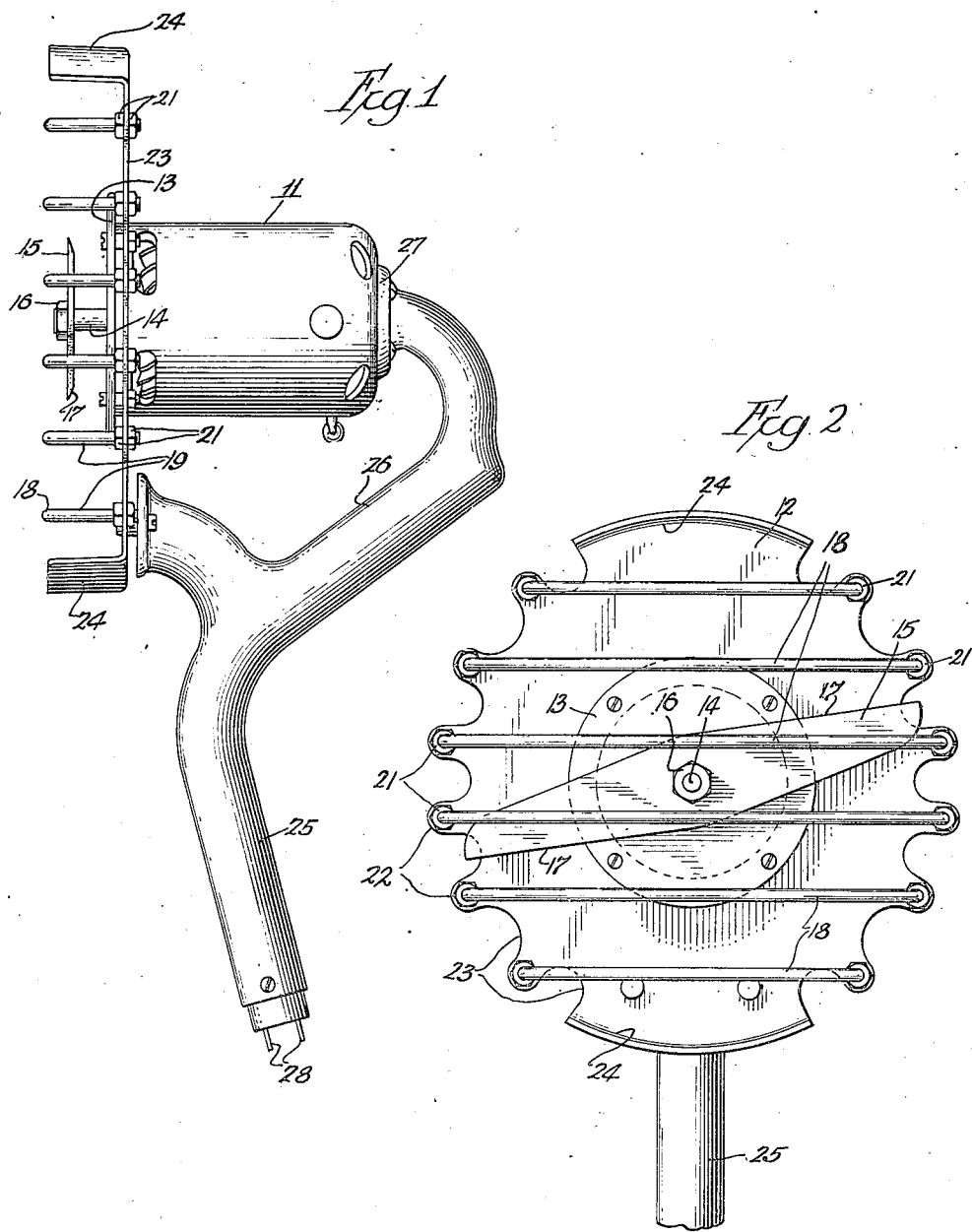

HEDGE TRIMMER

Henry J. Hunt, Chicago, Ill., assignor of one-half to S. Amundsen, Chicago, Ill.

Substituted for abandoned application Serial No. 682,219, July 26, 1933. This application September 9, 1939, Serial No. 294,122

2 Claims. (Cl. 30—276)

This invention relates to improvements in portable hedge trimmers, and the instant application is a substitute for my prior application, Serial No. 682,219, filed July 26, 1933.

A principal object of the invention is the provision of a hedge trimmer of the type in which a rotary blade cutting the twigs of the hedges is operated by a motor.

Another object of the invention is to equalize the work of the blade by avoiding the bunching of the twigs in front of the blade.

A further object of the invention is the provision of a hedge trimmer with means which in the operation of the trimmer exert a comb-like action upon the hedge portion located directly in front of the rotary knife to present to the cutting edge of the trimmer separated nearly uniform portions of hedge material to be acted on in rapid succession by the rotary knife.

Another important object of the invention is the provision of a hedge trimmer with a guard protecting the user of the device against accidental injury which he might suffer upon the approach of his hand to the lower face of the device.

Another object of the invention is the provision of a motor driven hedge trimmer with a guard device occupying a plane substantially parallel to the plane of the rotary cutter, this guard device, however, being sufficiently perforated to permit operation of the tool upon separate portions of the hedge presented to the action of the tool.

Another important object of the invention is the provision, in combination with a motor actuated hedge trimmer, of a new type of handle facilitating the manipulation of the entire tool and particularly the setting of the tool at varying angles relative to the hedge so as to permit the hedge to be cut to any desired shape.

Numerous other objects and advantages of the invention will be apparent as it is better understood from the following description, which, when considered in connection with the accompanying drawing, illustrates a preferred embodiment thereof.

In the drawing,

Figure 1 is a side elevation of the improved tool; and

Figure 2 is a top plan view of the same.

The improved hedge trimmer comprises substantially a motor 11, the housing of which is fixedly secured to a base plate 12 centrally thereof. The base plate is provided with closure plate 3 to protect the motor against impact of the cut material. The shaft 14 of the motor projects through the closure plate 13, and carries at the free end a rotary cutter 15 which, in the embodiment illustrated, is operated at the same speed as the armature of the motor.

The cutting blade 15 may be of any desired shape, and in the illustrated embodiment it consists of a symmetrically constructed narrow blade centrally secured to the shaft 14 by means of a nut 16, or the like, and having on each arm a straight cutting edge 17, whereby upon rotation of the blade in a predetermined direction, a rapid cutting action may be produced.

In order to prevent bunching of the twigs of the hedge directly in front of the cutting edge of the blade 15, and also to safeguard the operator during the use of the device, the improved hedge trimmer is provided with a guard which is substantially co-extensive with the base plate 12 or with the area described by the cutter blade in operation. This guard has openings over substantially its entire area so that the parts to be trimmed may project through said openings into engagement with the knife. The latter operates at each instant solely against those parts of the hedge which are presented to it through one of said openings of the guard.

The guard in the embodiment illustrated is constructed as a plurality of guard elements in the form of straight bars 18 which are spaced from each other and located in a plane parallel to the plane of the base plate 12 or parallel to the plane of rotation of the cutter 15. The twigs and branches of the hedge may project into the operative plane of the cutter through the spaces between these bars 18, whereby that portion of the hedge which is within operative reach of the cutter is subdivided into a plurality of sections, each corresponding to the width of these spaces between the guard elements 18.

The bars 18 may be advanced through the hedge, upon use of the entire tool, in the manner of teeth of a comb to facilitate the cutting operation.

In the embodiment illustrated, these bars 18 are of substantially circular cross-section and form the transverse parts of bail-shaped members, the parallel legs 19 of which are secured to the base plate by means of nuts 21. As shown in Fig. 2, the bars 18 extend also parallel to each other in the plane parallel to the plane of the cutter, and their ends 19 are secured to projecting portions 22 formed on the base plate 12 between indentations 23 with which the margin of this base plate is formed. The base plate itself has at diametrically opposite points arcuate flanges 24 of substantially the same height as the legs 19 of the bars 18 of the guard to co-operate with the guard members 18 adjacent thereto for presenting to the cutter also at these points sections only of the hedge to be trimmed.

The cutter, furthermore, is equipped with a handle having a stem 25 which is secured to the base plate, and a grip portion 26 extends from the stem adjacent the motor 11 to be united with the top of the motor at 27. In use the operator will grasp the stem with one hand and the grip portion with the other hand, and thereby the manipulation of the entire tool and particular changes in direction of applying the tool are greatly facilitated, enabling the operator to trim the hedge to any desired shape.

Conductors 28 for the motor may be suitably positioned in the handle, in a known way.

It is thought that the invention and many of its attendant advantages will be understood from the foregoing description, and it will be apparent the various changes may be made in the form, construction and arrangement of the parts without departing from the spirit and scope of the invention or sacrificing all of its material advantages, the form hereinbefore described being merely a preferred embodiment thereof.

I claim:

1. A portable manually supported hedge trimmer comprising a base plate, an electric motor mounted on said base plate at one side thereof, a rotary cutting blade driven by said motor and disposed on the opposite side of said base plate from said motor, a handle for manually supporting said base plate and motor, and a plurality of parallel substantially U-shaped bars secured at their opposite ends to said base plate for guiding the twigs or branches of said hedge into the path of movement of said blade and for supporting the same while being severed thereby, said bars being spaced throughout their length to provide for the unobstructed passage of said twigs or branches therebetween when the trimmer is moved either forwardly or backwardly substantially parallel therewith.

2. A device of the class described, comprising a base plate, a cutting blade mounted for rotation in a plane parallel to that of said base plate, and a plurality of parallel, substantially U-shaped bars secured respectively at their opposite ends to said base plate for guiding the material to be cut into the path of movement of said blade and for supporting the same while being severed thereby, said bars being spaced from each other for their entire length to provide for the unobstructed passage therebetween of the material to be cut when the device is moved either forwardly or backwardly substantially parallel with the bars.

HENRY J. HUNT.